Patented Oct. 12, 1954

2,691,671

UNITED STATES PATENT OFFICE 2,691,671

CARBONYLATION OF AROMATIC HALIDES

Henry J. Leibu, Wilmington, Del., assignor to E. I. du Pont de Nemours and Company, Wilmington, Del., a corporation of Delaware No Drawing. Application February 6, 1952, Serial No. 270,279

4 Claims. (Cl. 260—475)

This invention relates to an improved process for cabonylation of aryl halides, such as monochlorobenzene, dichlorobenzenes and related compounds. The specific improvement to which the present invention is directed relates to the use of specific solid catalysts, which have a beneficial effect upon the carbonylation reaction.

The term "carbonylation," as employed herein, means the introduction of C=O into an organic molecule.

It has been known heretofore that the carbonylation of aryl halides takes place to a certain extent in the presence of specific catalysts such as nickel chloride, nickel nitrate, nickel formate, mixed nickel oxalate-copper oxalate, etc., especially in the presence of water, which causes the hydrolysis of the aryl halides initially formed with the resultant production of aromatic carboxylic acids (Dieterle and Eschenbach, German Patent 537,610 and Arch. Pharm. 265, 187-93 (1927)). More recently it has been discovered (Bliss and Southworth, U. S. Patent 2,565,461, and Prichard and Tabet, U. S. Patent 2,565,462) that the carbonylation of aryl halides takes place quite efficiently in the presence of carbonyls of metals of the iron sub-group, especially if an organic reactant is present which is capable of converting the aroyl halides, which is initially formed, to an ester of the corresponding aromatic acid. The said organic reactants include alcohols, alkoxyalkanes, and phenols.

In accordance with the prior art processes hereinabove described, mono-alkyl and di-alkyl terephthalates could be obtained by carbonylation of dichlorobenzene in the presence of alkoxy donors.

An object of the present invention is to provide an improved catalytic process whereby the carbonylation of aryl halides can be effected in excellent yield and at greatly improved reaction rates. Another object is to provide a process for carbonylation of aryl halides in the presence of novel catalysts which do not unduly interfere with the separation of the reaction products from the crude reaction mixtures. Other objects of the invention will appear hereinafter.

The present invention provides a novel method for carbonylation of aryl halides by the use of specific solid catalysts containing metallic copper in combination with metallic zinc. The invention is preferably carried out in the presence of an oxy compound, examples of which include hydroxyalkanes, alkoxyalkanes, alkoxyhydroxyalkanes, cycloalkanols, cycloalkenols, alkenols, alkynols, and phenols. Mixtures of the said alkoxy donors, especially mixtures of alkanols and alkoxyalkanes, are effective.

One of the remarkable and surprising features of the present invention is the fact that it does not require a nickel-containing catalyst; in fact, the invention is carried out in the absence of any of the iron sub-group metals or their carbonyls.

The aryl halide reactants, in general, contain chlorine, bromine or iodine attached directly to the aromatic nucleus. Such compounds include monochlorobenzene, o-dichlorobenzene, m-dichlorobenzene, p-dichlorobenzene, chloronaphthalenes, chloroanthracenes, and the corresponding bromo and iodo compounds. It is to be understood that the polyhaloaromatic compounds may undergo a reduction reaction to some extent during the course of the carbonylation reaction. For example, when the haloaromatic compound is a trichlorobenzene, the carbonylation product will include not only those esters containing three carbalkoxy groups but also esters containing two carbalkoxy groups, and even a certain amount of ester containing only one carbalkoxy group.

Any organic compound capable of converting a

halogen group to an ester group may be employed in the practice of the invention. Preferred organic reactants for this purpose are the alkoxy donors such as the lower alcohols and the lower dialkyl ethers. Suitable examples of such compounds are methanol, isopropanol, tertiary butanol, polyvinyl alcohol, ethylene glycol, allyl alcohol, cyclopentanol, dimethyl ether, diethyl ether, ethoxyethanol, phenol, toluol, beta-naphthol, etc.

The carbonylation of an aryl halide in the presence of an alkoxy donor may be illustrated by means of the following equation:

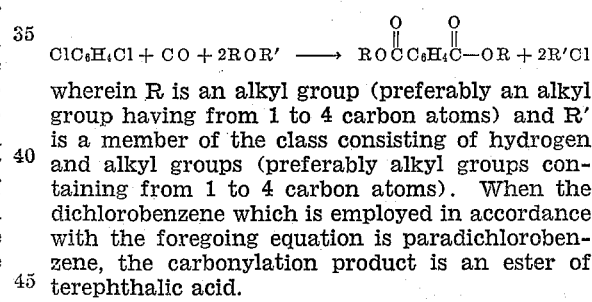

wherein R is an alkyl group (preferably an alkyl group having from 1 to 4 carbon atoms) and R' is a member of the class consisting of hydrogen and alkyl groups (preferably alkyl groups containing from 1 to 4 carbon atoms). When the dichlorobenzene which is employed in accordance with the foregoing equation is paradichlorobenzene, the carbonylation product is an ester of terephthalic acid.

The carbonylation of aryl halides in accordance with this invention takes place at temperatures as low as about 200° C. although optimum results are obtained by carrying out the reaction at temperatures within the range of about 250° C. to 450° C. Best results are achieved at pressures above atmospheric, preferably within the range of about 200 to 1500 atmospheres.

Any suitable reaction vessel, preferably adapted to use under continuous flow conditions, may be employed in the practice of the invention. Reaction vessels made of or lined with inert metals such as stainless steel, platinum, etc. are most frequently employed. The catalyst is generally present in the reaction vessel in the form of a fixed bed, although it is possible to carry out the process of the invention by the use of the so-called fluidized solid catalyst technique. If desired, the reactants may be injected at one or more points along the tubular reaction vessel, but this is generally not necessary or even advantageous.

Any suitable method may be employed for separating the carbonylation products from the reaction mixture obtained in the practice of the invention. Since the reaction products are usually esters, and since these products are not contaminated with nickel carbonyl or other interfering substances as in prior art processes, one of the important advantages of the invention is the ease of separating the carbonylation products from the other ingredients of the reaction mixture. The esters can be obtained in sufficiently pure form to be employed as polymer intermediates, plasticizers, etc. by direct distillation of the crude reaction mixtures.

The quantity of carbon monoxide injected with the aryl halide may be varied over a rather wide range, but it is generally preferred to employ at least the stoichiometrically required quantity, a slight excess being advantageously present in the reaction zone. From the standpoint of economy, it is not preferred to employ a large excess of the carbon monoxide. Hydrogen may be present in the reaction mixture, and in some instances it exerts a somewhat beneficial effect. However, the reaction takes place very readily in the absence of added hydrogen. Hydrogen may be employed, however, in producing reduced copper from copper-zinc oxides, etc. Such reduction may be carried out at a temperature of about 300° C., for example.

The invention is illustrated further by means of the following examples:

*Example 1.*—Into a stainless steel shaker tube of about 300 cc. capacity was placed 20 grams of p-dichlorobenzene, 35 grams dimethyl ether, 140 grams of benzene, and 7 grams of a copper-zinc catalyst, prepared from aqueous copper-and-zinc-sulfate by precipitation with sodium carbonate, ignition and reduction with hydrogen. Carbon monoxide was injected into the tube, and the mixture was heated with intermittent introduction of carbon monoxide until the temperature was 347° to 355° C. and the pressure was 450 to 500 atmospheres. The mixture was heated at this temperature and pressure for 3 hours, after which the reaction vessel was cooled and the product with withdrawn. Distillation of the liquid part of the product under diminished pressure gave methyl p-chlorobenzoate (20.2% conversion), dimethylterephthalate (21% conversion), and recovered p-dichlorobenzene (51.4% recovery).

*Example 2.*—Into a stainless steel shaker tube of about 300 cc. capacity was placed 40 grams monobromobenzene, 100 grams benzene, 36 grams water, and 7 grams of copper-zinc catalyst. Carbon monoxide was injected into the tube, and the mixture was heated with shaking for one hour at 320° to 330° C. at 590–650 atmospheres' pressure. After cooling, the products were withdrawn. On extraction with 10 per cent sodium hydroxide and acidifying the extract, there was recovered after drying 20 grams of benzoic acid (M. P. 119–120°, mixed M. P. 119–120° C.) which represents a 64.4 per cent yield. Distillation of the resulting solvent layer gave no bromobenzene.

*Example 3.*—Into a platinum-lined shaker tube of about 300 cc. capacity was placed 40 grams monobromobenzene, 100 grams benzene, 36 grams water, and 7 grams of a copper-zinc catalyst, and the mixture was heated with carbon monoxide, as in Example 2. After reaction for 1 hour at 320° to 326° C. at 700 atmospheres' pressure and working up the product as above described there was obtained 16 grams of benzoic acid.

It is to be understood that the foregoing examples are illustrative only and that they are not intended to limit the scope of the invention. Similar results are obtained, for example, using an iodobenzene as the haloaromatic reactant.

Numerous methods for modifying the illustrated procedure will be apparent to those who are skilled in the art. For example, any unreacted aryl halide may be continuously recovered from the distillation step and recycled to the reaction zone. It is our intention that all such changes and modifications to the extent that they are within the scope of the appended claims shall be considered as part of my invention.

I claim:

1. In the process for carbonylation of a compound having at least one halogen atom of the class consisting of the chlorine, bromine and iodine attached to a benzene nucleus, the improvement which comprises carrying out the carbonylation of the said compound in the presence of a solid copper-zinc catalyst which is substantially free of any metal of the iron subgroup and which is formed by reduction of copper in copper-zinc oxides.

2. In the process for carbonylation of aryl chlorides having —Cl attached directly to a benzene nucleus the improvement which comprises carrying out the carbonylation of said aryl chloride by reaction with carbon monoxide in the presence of a solid copper-zinc catalyst which is free of any metal of the iron subgroup and which is formed by reduction of copper in copper-zinc oxides, and also in the presence of an alkoxy donor of the formula ROR' wherein R is an alkyl group having from 1 to 4 carbon atoms and R' is a member of the class consisting of hydrogen and alkyl groups having from 1 to 4 carbon atoms, and separating from the resulting mixture the ester product by the carbonylation reaction.

3. The method of claim 2, in which the said aryl chloride is para-dichlorobenzene.

4. In a process for preparing a methyl ester of terephthalic acid by reaction between p-dichlorobenzene, carbon monoxide, and methanol, the step which comprises conducting p-dichlorobenzene, carbon monoxide and methanol over a solid copper-zinc catalyst which is free of any metal of the iron subgroup at a temperature within the range of 200° C. to 450° C. under a pressure within the range of 200 to 1500 atmospheres whereby a methyl ester of terephthalic acid is produced and thereafter separating said ester from the reaction mixture, said catalyst being formed by reduction of copper in copper-zinc oxides.

References Cited in the file of this patent

UNITED STATES PATENTS

| Number | Name | Date |
|---|---|---|
| 2,062,344 | Wiezevich et al. | Dec. 1, 1936 |
| 2,275,467 | Pollack et al. | Mar. 10, 1942 |
| 2,565,461 | Bliss | Aug. 28, 1951 |